(12) United States Patent
Johansson et al.

(10) Patent No.: US 9,193,264 B2
(45) Date of Patent: Nov. 24, 2015

(54) METHOD AND MODULE FOR DETERMINING OF AT LEAST ONE REFERENCE VALUE FOR A VEHICLE CONTROL SYSTEM

(75) Inventors: Oskar Johansson, Stockholm (SE); Maria Södergren, Segeltorp (SE); Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/367,509

(22) PCT Filed: Dec. 22, 2011

(86) PCT No.: PCT/SE2011/051577
§ 371 (c)(1),
(2), (4) Date: Jun. 20, 2014

(87) PCT Pub. No.: WO2013/095238
PCT Pub. Date: Jun. 27, 2013

(65) Prior Publication Data
US 2014/0343818 A1 Nov. 20, 2014

(30) Foreign Application Priority Data
Dec. 22, 2011 (SE) ...................................... 1151257

(51) Int. Cl.
*B60K 31/00* (2006.01)
*G05B 13/02* (2006.01)
*G05B 13/04* (2006.01)

(52) U.S. Cl.
CPC .............. *B60K 31/00* (2013.01); *G05B 13/026* (2013.01); *G05B 13/048* (2013.01); *B60K 2310/244* (2013.01); *B60W 2550/402* (2013.01); *Y02T 10/84* (2013.01)

(58) Field of Classification Search
CPC ....... A01D 34/40; A01D 41/14; A01D 57/02; B02C 15/006; B02C 23/00; B02C 25/00; B60K 28/16; B60K 6/46; B60L 2200/26; B60L 2210/20; B60L 3/06; B60L 3/10; B60L 9/00; B60T 1/10; B60T 2270/602; B60T 8/175; B60T 8/17616; B60W 10/08; B60W 2520/26; B66B 11/043; B66B 11/0438; G01N 1/06; G01N 2001/066; G01N 2001/2873; H02K 16/00; H02K 7/1004; H02K 7/14; Y02T 10/6217; Y02T 10/725; Y02T 10/7258; Y02T 90/16; Y10T 83/061; Y10T 83/081; Y10T 83/141; Y10T 83/6492; Y10T 83/6499; Y10T 83/8765
USPC ............. 701/82; 83/575; 187/277; 56/10.2 R; 241/30
See application file for complete search history.

(56) References Cited

U.S. PATENT DOCUMENTS 5,839,534 A   11/1998  Chakraborty et al.
5,931,886 A    8/1999  Moroto et al.

(Continued)

FOREIGN PATENT DOCUMENTS

DE   10 2005 045 891       2/2007
DE   10 2009 030 784 A1    2/2010

(Continued)

OTHER PUBLICATIONS

Hellström, E. et al., "Look-ahead control for heavy trucks to minimize trip time and fuel consumption", Control Engineering Practice, 2009, vol. 17, No. 2, pp. 245-254, ISSN 0967-0661.

(Continued)

*Primary Examiner* — James Trammell
*Assistant Examiner* — Sanjeev Malhotra
(74) *Attorney, Agent, or Firm* — Ostrolenk Faber LLP (57) ABSTRACT

A method for determining a reference value for controlling a vehicle's speed by a vehicle control system is described. The method includes: making a first prediction and a second prediction of the speed along a horizon, the first prediction based on an engine torque that retards the vehicle as compared with a conventional cruise control, and the second prediction based on an engine torque that accelerates the vehicle as compared with the conventional cruise control; comparing the first prediction and second prediction, respectively, with a lower limit value and/or an upper limit value, which delineate a speed range within which the speed is to be maintained; and determining the reference value based on at least one of the respective comparisons and the first prediction and second prediction so that the set speed is within the speed range bounded by the lower and upper limit values.

16 Claims, 3 Drawing Sheets

(56) References Cited

U.S. PATENT DOCUMENTS

| | | |
|---|---|---|
| 6,076,036 A | 6/2000 | Price et al. |
| 6,098,005 A | 8/2000 | Tsukamoto et al. |
| 6,282,483 B1 | 8/2001 | Yano et al. |
| 6,782,961 B1 | 8/2004 | Ishikawa et al. |
| 6,990,401 B2 | 1/2006 | Neiss et al. |
| 7,103,460 B1 | 9/2006 | Breed |
| 7,315,804 B2 | 1/2008 | Sato et al. |
| 8,260,488 B2 | 9/2012 | Ishikawa et al. |
| 8,620,557 B2 | 12/2013 | Johansson et al. |
| 8,620,558 B2 | 12/2013 | Johansson et al. |
| 2003/0221886 A1 | 12/2003 | Petrie, Jr. |
| 2004/0068359 A1 | 4/2004 | Neiss et al. |
| 2004/0149106 A1* | 8/2004 | Hess .............. G01N 1/06 83/575 |
| 2004/0182652 A1* | 9/2004 | Ammon .............. B66B 11/043 187/277 |
| 2005/0096183 A1 | 5/2005 | Watanabe et al. |
| 2005/0273218 A1 | 12/2005 | Breed et al. |
| 2006/0106521 A1* | 5/2006 | Nasr .............. B60K 6/46 701/82 |
| 2007/0012013 A1* | 1/2007 | Strosser .............. A01D 34/40 56/10.2 R |
| 2007/0208485 A1 | 9/2007 | Yamamura et al. |
| 2007/0265759 A1 | 11/2007 | Salinas et al. |
| 2008/0033621 A1 | 2/2008 | Nakamura et al. |
| 2009/0118918 A1 | 5/2009 | Heap et al. |
| 2009/0118920 A1 | 5/2009 | Heap et al. |
| 2010/0049400 A1 | 2/2010 | Duraiswamy et al. |
| 2010/0193616 A1* | 8/2010 | Berger .............. B02C 15/006 241/30 |
| 2010/0198450 A1 | 8/2010 | Shin |
| 2011/0106388 A1 | 5/2011 | Boeckenhoff et al. |
| 2011/0208405 A1 | 8/2011 | Tripathi et al. |
| 2011/0213540 A1 | 9/2011 | Tripathi et al. |
| 2011/0276216 A1 | 11/2011 | Vaughan |
| 2012/0150411 A1 | 6/2012 | Oosawa et al. |
| 2012/0277940 A1 | 11/2012 | Kumar et al. |
| 2014/0277971 A1 | 9/2014 | Oshiro et al. |

FOREIGN PATENT DOCUMENTS

| | | |
|---|---|---|
| DE | 10 2008 035 944 A1 | 4/2010 |
| DE | 10 2010 003 428 A1 | 10/2011 |
| EP | 0 838 363 | 4/1998 |
| GB | 2480877 A | 12/2011 |
| JP | 2007-276542 | 10/2007 |
| WO | WO 2006/107267 A1 | 10/2006 |
| WO | WO 2010/144028 A1 | 12/2010 |
| WO | WO 2010/144030 A1 | 12/2010 |
| WO | WO 2011/126430 A1 | 10/2011 |
| WO | WO 2011/126431 A1 | 10/2011 |
| WO | WO 2011/162705 A1 | 12/2011 |
| WO | WO 2011/162706 A1 | 12/2011 |

OTHER PUBLICATIONS

International Search Report dated Sep. 13, 2012 issued in corresponding International patent application No. PCT/SE2011/051577.
International Search Report mailed Sep. 6, 2012 in corresponding PCT International Application No. PCT/SE2011/051568.
International Search Report mailed Sep. 7, 2012 in corresponding PCT International Application No. PCT/SE2011/051578.
International Search Report mailed Sep. 7, 2012 in corresponding PCT International Application No. PCT/SE2011/051575.
International Search Report dated Sep. 14, 2012 issued in corresponding International patent application No. PCT/SE2011/051570.
International Search Report mailed Sep. 11, 2012 in corresponding PCT International Application No. PCT/SE2011/051585.
International Search Report mailed Sep. 7, 2012 in corresponding PCT International Application No. PCT/SE2011/051569.
Erik Hellström, "Explicit use of road topography for model predictive cruise control in heavy trucks," Master's thesis performed in Vehicular Systems, ISRN: LiTH-ISY-EX—05/3660—SE, Linköping, Feb. 21, 2005.
Maria Ivarsson, "Fuel Optimal Powertrain Control for Heavy Trucks Utilizing Look Ahead," Linköping Studies in Science and Technology, Thesis No. 1400, ISBN 978-91-7393-637-8, SE, Linköping, 2009.
Sangjun Park et al., "Predictive Eco-Cruise Control: Algorithm and Potential Benefits," 2011 IEEE Forum on Integrated and Sustainable Transportation Systems (FISTS), pp. 394-399, Vienna, Austria, Jun. 29-Jul. 1, 2011.
Office Action mailed Mar. 16, 2015 in U.S. Appl. No. 14/364,796.
Office Action mailed Apr. 21, 2015 in U.S. Appl. No. 14/365,361.
Notice of Allowance mailed Apr. 13, 2015 in U.S. Appl. No. 14/367,465.
Notice of Allowance mailed Apr. 24, 2015 in U.S. Appl. No. 14/365,331.

* cited by examiner

METHOD AND MODULE FOR DETERMINING OF AT LEAST ONE REFERENCE VALUE FOR A VEHICLE CONTROL SYSTEM

CROSS-REFERENCE TO RELATED APPLICATIONS

The present application is a 35 U.S.C. §§371 national phase conversion of PCT/SE2011/051577, filed Dec. 22, 2011, which claims priority of Swedish Application No. 1151257-1, filed Dec. 22, 2011. The contents of both applications are incorporated by reference herein. The PCT International Application was published in the English language.

FIELD OF THE INVENTION

The present invention relates to a method and a module for determination of at least one reference value which indicates how a vehicle's speed is to be influenced and which can be used to control at least one control system of the vehicle as described herein.

BACKGROUND TO THE INVENTION

Cruise control is now usual in motor vehicles, e.g. cars, trucks and buses. An object of cruise control is to achieve a uniform predetermined speed. This is done either by adjusting the engine torque to avoid retardation, or by applying braking action on downhill runs where the vehicle is accelerated by its own weight. A more general object of cruise control is to provide convenient driving and better comfort for the vehicle's driver.

A driver of a vehicle equipped with cruise control usually chooses a set speed $v_{set}$ as the speed he/she wishes the vehicle to maintain on level roads. A cruise control then supplies an engine system of the vehicle with a reference speed $v_{ref}$ used for control of the engine. The set speed $v_{set}$ may thus be regarded as an input signal to the cruise control, whereas the reference speed $v_{ref}$ may be regarded as an output signal from the cruise control and is used for control of the engine.

Today's traditional cruise control (CC) maintains a constant reference speed $v_{ref}$ usually set by the vehicle's driver in the form of a set speed $v_{set}$ which is thus here a desired speed chosen for example by him/her, and for today's conventional cruise controls the reference speed is constant and equal to the set speed, i.e. $v_{ref} = v_{set}$. The value of the reference speed $v_{ref}$ changes only when adjusted by the driver while the vehicle is in motion. The reference speed $v_{ref}$ is then sent to a control system which controls the vehicle so that its speed corresponds when possible to the reference speed $v_{ref}$. If the vehicle is equipped with an automatic gearchange system, the gears may be changed by that system on the basis of the reference speed $v_{ref}$ to enable the vehicle to maintain the reference speed $v_{ref}$, i.e. to enable it to maintain the desired set speed $v_{set}$.

In hilly terrain, the cruise control system will try to maintain the set speed $v_{set}$ uphill and downhill. This may result inter alia in the vehicle accelerating over the crest of a hill and into a subsequent downgrade. It will then need to be braked to avoid exceeding the set speed $v_{set}$ or will reach a speed $v_{kfb}$ at which the constant speed brake is activated, which is a fuel-expensive way of driving the vehicle. It may also need to be braked downhill to avoid exceeding the set speed $v_{set}$ or the constant speed brake's activation speed $v_{kfb}$ in cases where the vehicle does not accelerate over the crest of the hill.

To reduce fuel consumption, especially on hilly roads, economical cruise controls such as Scania's Ecocruise® have been developed. This cruise control tries to estimate the vehicle's current running resistance and also has information about its historical running resistance. The economical cruise control may also be provided with map data comprising topographical information. The vehicle is then located on the map, e.g. by means of GPS, and the running resistance along the road ahead is estimated. The vehicle's reference speed $v_{ref}$ can thus be optimised for different types of roads in order to save fuel, in which case the reference speed $v_{ref}$ may differ from the set speed $v_{set}$. This specification refers to cruise controls which allow the reference speed $v_{ref}$ to differ from the set speed $v_{set}$ chosen by the driver, i.e. reference speed-regulating cruise controls.

An example of a further development of an economical cruise control is a "look ahead" cruise control (LACC), a strategic form of cruise control which uses knowledge of sections of road ahead, i.e. knowledge of the nature of the road ahead, to determine the reference speed $v_{ref}$. LACC is thus an example of a reference speed-regulating cruise control whereby the reference speed $v_{ref}$ is allowed, within a certain range $[v_{min}, v_{max}]$, to differ from the set speed $v_{set}$ chosen by the driver, in order to achieve more fuel saving.

Knowledge of the road section ahead may for example comprise information about prevailing topology, road curvature, traffic situation, roadworks, traffic density and state of road. It may further comprise a speed limit on the section ahead, and a traffic sign beside the road. Such knowledge is for example available from location information, e.g. GPS (global positioning system) information, map information and/or topographical map information, weather reports, information communicated between vehicles and information provided by radio. All this knowledge may be used in a variety of ways. For example, information about a speed limit on the road ahead may be used to achieve fuel efficiency by lowering the vehicle's speed before reaching a lower speed limit. Similarly, knowledge of a road sign which indicates for example a roundabout or intersection ahead may also be used to achieve fuel efficiency by braking before the vehicle reaches the roundabout or intersection.

An LACC cruise control does for example make it possible, before a steep upgrade, for the reference speed $v_{ref}$ to be raised to a level above the set speed $v_{set}$, since the vehicle will be expected to lose speed on such a climb owing to high train weight relative to engine performance. Similarly, before a steep downgrade, the LACC cruise control makes it possible for the reference speed $v_{ref}$ to be lowered to a level below the set speed $v_{set}$, since the vehicle will be expected to accelerate on such a downgrade owing to its high train weight. The concept here is that reducing the speed at which the vehicle begins the downhill run makes it possible to reduce the energy braked away and/or the air resistance losses (as reflected in the amount of fuel injected before the downgrade). The LACC cruise control may thus reduce fuel consumption without substantially affecting journey time.

In hilly terrain, a reference speed-regulating cruise control, unlike a conventional cruise control, can thus actively vary the vehicle's speed. For example, the vehicle's speed will be reduced before a steep downgrade to enable it to utilise more of the cost-free energy provided by the downgrade, instead of braking it away. The speed may also be increased before a steep climb to prevent the vehicle from losing too much speed and time.

A problem with reference speed-regulating cruise controls is that it is difficult for the control system to determine how much the cruise control is to be allowed to vary the reference speed $v_{ref}$.

This is because external parameters, e.g. traffic situation, driver temperament and terrain may also affect the range within which it is appropriate to allow the reference speed $v_{ref}$ to vary in a specific situation. A wider speed range generally results in more fuel saving but also in large speed variations which may be disturbing to surrounding traffic.

In the aforesaid Scania Ecocruise® function there is a tightly specified speed range between the truck's speed limit (which is often 89 km/h) and a lower speed which is 20 km/h below the set speed but never below 60 km/h.

US-2003/0221886 refers to a cruise control in which speed ranges are set. The system can anticipate downgrades and upgrades and incorporate them in the calculations, but the specification gives no details about how this is done in practice.

DE-10 2005 045 891 refers to a cruise control system for a vehicle which sets a range within which the vehicle's speed is allowed to vary. The object is inter alia to account for the wind conditions to which the vehicle is subject.

JP-2007276542 refers to a cruise control in which the vehicle's speed is allowed to fluctuate relative to a predetermined speed in order to reduce fuel consumption.

SUMMARY OF THE DISCLOSURE

The object of the present invention is to propose an improved module and method for cruise control which take sections of road ahead into account when adjusting the vehicle's speed, and in particular to propose a module and a method which simplify vehicle handling and provide the driver with user-friendly assistance. The present invention relates to a user interface for such a function.

According to an aspect of the present invention, at least one of the objects described above is achieved by using the aforesaid method to control a vehicle's speed, which method is characterised by:
  making a first prediction $v_{pred\_Tnew\_ret}$ and a second prediction $v_{pred\_Tnew\_acc}$ of a vehicle speed along a horizon, said first prediction based on an engine torque $T_{ret}$ which retards the vehicle as compared with a conventional cruise control, and said second prediction based on an engine torque $T_{acc}$ which accelerates the vehicle as compared with a conventional cruise control;
  comparing said respective first prediction $v_{pred\_Tnew\_ret}$ and second prediction $v_{pred\_Tnew\_acc}$ of the vehicle speed with a lower limit value $v_{min}$ and/or an upper limit value $v_{max}$ which delineate a range within which the vehicle's speed should be; and
  determining at least one reference value based on at least one of said respective comparisons and said first prediction $v_{pred\_Tnew\_ret}$ and second prediction $v_{pred\_Tnew\_acc}$ of the vehicle speed along the horizon so that said set speed $v_{set}$ is within said range bounded by the lower and upper limit values $v_{min}$ and $v_{max}$.

According to an aspect of the present invention, at least one of the objects described above is achieved by using the aforesaid module to control a vehicle's speed, which module is characterised by:
  making a first prediction $v_{pred\_Tnew\_ret}$ and a second prediction $v_{pred\_Tnew\_acc}$ of a vehicle speed along a horizon, said first prediction based on an engine torque $T_{ret}$ which retards the vehicle as compared with a conventional cruise control, and said second prediction based on an engine torque $T_{acc}$ which accelerates the vehicle as compared with a conventional cruise control;
  comparing said respective first prediction $v_{pred\_Tnew\_ret}$ and second prediction $v_{pred\_Tnew\_acc}$ of the vehicle speed with a lower limit value $v_{min}$ and/or an upper limit value $v_{max}$ which delineate a range within which the vehicle's speed should be; and
  determining at least one reference value based on at least one of said respective comparisons and said first prediction $v_{pred\_Tnew\_ret}$ and second prediction $v_{pred\_Tnew\_acc}$ of the vehicle speed along the horizon so that said set speed $v_{set}$ is within said range bounded by the lower and upper limit values $v_{min}$ and $v_{max}$.

The vehicle's fuel consumption can be minimised by regulating according to the invention, since it takes into account information about the vehicle's itinerary. Map data, e.g. in the form of an on-board database with altitude information, and a positioning system, e.g. GPS, provide information about road topography along the itinerary which can be used in determining the at least one reference value. The control system is then supplied with the at least one reference value and proceeds to regulate the vehicle according to these one or more reference values.

Applying a method which defines the limits for the magnitude of the reference value, i.e. which defines the lower and upper limit values $v_{min}$ and $v_{max}$ which delineate the range within which the vehicle's speed should be, results in a predictable and robust way of quickly calculating reference values for use by one or more of the vehicle's control systems.

According to the present invention, the driver can manually set a set speed $v_{set}$ and the range, i.e. the lower and upper limit values $v_{min}$ and $v_{max}$ relative to the set speed $v_{set}$ between which the cruise control is actively allowed to function. The lower and upper limit values $v_{min}$ and $v_{max}$ may, according to an embodiment, be related to the set speed $v_{set}$. This relationship takes the form, according to various embodiments, of a percentage of the set speed $v_{set}$ or a predetermined speed value, e.g. a predetermined number of km/h related to the set speed $v_{set}$. Various predefined range widths may also be selectable by the driver.

These embodiments make setting the cruise control's parameters very user-friendly. By one or two very simple inputs the driver can determine how the vehicle's speed is to be controlled.

According to an embodiment of the invention, the range, i.e. the lower and upper limit values $v_{min}$ and $v_{max}$, is determined automatically. This setting is based on calculations of appropriate range width, which may for example take into account the length of a time gap to a vehicle in front so that the range is narrower for a short time gap and wider for a longer time gap.

The automatic setting of the range means that the driver can devote full attention to the road ahead instead of making inputs to the cruise control system, which does of course make driving the vehicle safer.

Preferred embodiments of the invention are described herein.

BRIEF DESCRIPTION OF THE ATTACHED DRAWINGS

The invention is described below with reference to the attached drawings, in which.

DETAILED DESCRIPTION OF PREFERRED EMBODIMENTS OF THE INVENTION

Figure 1:
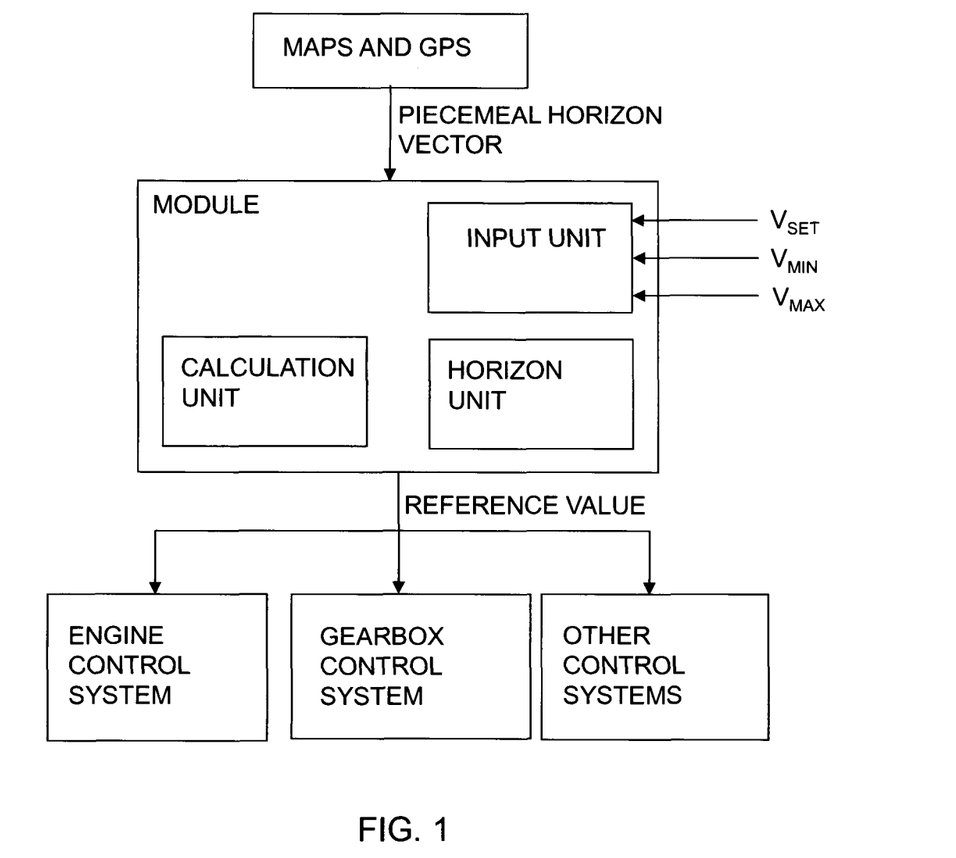
FIG. 1 depicts a regulating module according to an embodiment of the invention.

FIG. 1 depicts a module for controlling a vehicle's speed according to an aspect of the invention. The module comprises an input unit adapted to receiving a desired speed, i.e. a set speed $v_{set}$, for the vehicle. The driver may for example set a speed $v_{set}$ which he/she wishes the vehicle to maintain. The input unit may also be adapted to receiving input values for the lower limit value $v_{min}$ and for the upper limit value $v_{max}$. The module comprises also a horizon unit adapted to determining a horizon H for the itinerary by means of map data and location data. The horizon H is made up of route segments with at least one characteristic for each segment. A possible example of characteristics of segments is their gradient $\alpha$, in radians.

The description of the present invention states that GPS (global positioning system) is used to determine location data for the vehicle, but specialists will appreciate that other kinds of global or regional positioning systems are conceivable to provide these data. Such positioning systems might for example use radio receivers to determine the vehicle's location. The vehicle might also use sensors to scan the surroundings and thereby determine its location.

FIG. 1 illustrates how the module is provided with information about the itinerary from maps (map data) and GPS (location data). The itinerary is sent to the module bit by bit, e.g. via CAN (controller area network) bus. The module may be separate from or be part of the one or more control systems which are to use reference values for regulating. An example of such a control system is the vehicle's engine control system. The control system may also be any other appropriate control system of the vehicle, e.g. cruise control, gearbox control system or other control systems. A horizon is usually put together for each control system, since the control systems regulate on different parameters. Alternatively, the unit which handles maps and positioning systems may also be part of a system which is to use reference values for regulating. In the module, the bits of the itinerary are then put together in a horizon unit to construct a horizon and are processed by the processor unit to create an internal horizon on which the control system can regulate. The horizon is then continually supplemented by new bits of itinerary from the unit with GPS and map data, to maintain a desired length of horizon. The horizon is thus updated continuously when the vehicle is in motion.

CAN is a serial bus system specially developed for use in vehicles. The CAN data bus makes digital data exchange possible between sensors, regulating components, actuators, control devices etc., and provides assurance that two or more control devices can have access to the signals from a given sensor in order to use them to control components connected to them. Each of the connections between the units illustrated in FIG. 1 may take the form of one or more from among a cable, a data bus, e.g. a CAN (controller area network) bus, an MOST (media orientated systems transport) bus, or some other bus configuration, or a wireless connection.

The module comprises also a calculation unit adapted to making a first prediction $v_{pred\_Tnew\_ret}$ and a second prediction $v_{pred\_Tnew\_acc}$ of a vehicle speed along a horizon, said first prediction based on an engine torque $T_{ret}$ which retards the vehicle as compared with a conventional cruise control, and said second prediction based on an engine torque $T_{acc}$ which accelerates the vehicle as compared with a conventional cruise control.

The module is further adapted to comparing said respective first prediction $v_{pred\_Tnew\_ret}$ and second prediction $v_{pred\_Tnew\_acc}$ of the vehicle speed with a lower limit value $v_{min}$ and/or an upper limit value $v_{max}$ which delineate a range within which the vehicle's speed should be. According to the present invention, the lower and upper limit values $v_{min}$ and $v_{max}$ are determined such that the set speed $v_{set}$ is within the range bounded by them. How these limit values are determined according to various embodiments of the invention will be described in more detail below.

The module is further arranged to determine at least one reference value based on at least one of the respective comparisons and said first prediction $v_{pred\_Tnew\_ret}$ and said second prediction $v_{pred\_Tnew\_acc}$ of the vehicle speed along the horizon.

The module is further arranged to supply, e.g. by sending, to a control system of the vehicle said at least one reference value on which the vehicle is regulated. How the predictions of the speeds are made will be explained in more detail below.

The module and/or the calculation unit comprise at least a processor and a memory unit which are adapted to make all the calculations, predictions and comparisons of the method according to the invention. A processor as used here means a processor or microcomputer, e.g. a circuit for digital signal processing (digital signal processor, DSP), or a circuit with a predetermined specific function (application specific integrated circuit, ASIC). The calculation unit is connected to a memory unit which provides it with, for example, the stored program code and/or stored data which the calculation unit needs to enable it to do calculations. The calculation unit is also adapted to storing partial or final results of calculations in the memory unit.

The method for control of vehicle speed according to the present invention and its various embodiments may also be implemented in a computer program which, when executed in a computer, e.g. the aforesaid processor, causes the computer to apply the method. The computer program usually takes the form of a computer program product stored on a digital storage medium, and is contained in a computer program product's computer-readable medium which comprises a suitable memory, e.g. ROM (read-only memory), PROM (programmable read-only memory), EPROM (erasable PROM), flash memory, EEPROM (electrically erasable PROM), a hard disc unit, etc.

Figure 2:
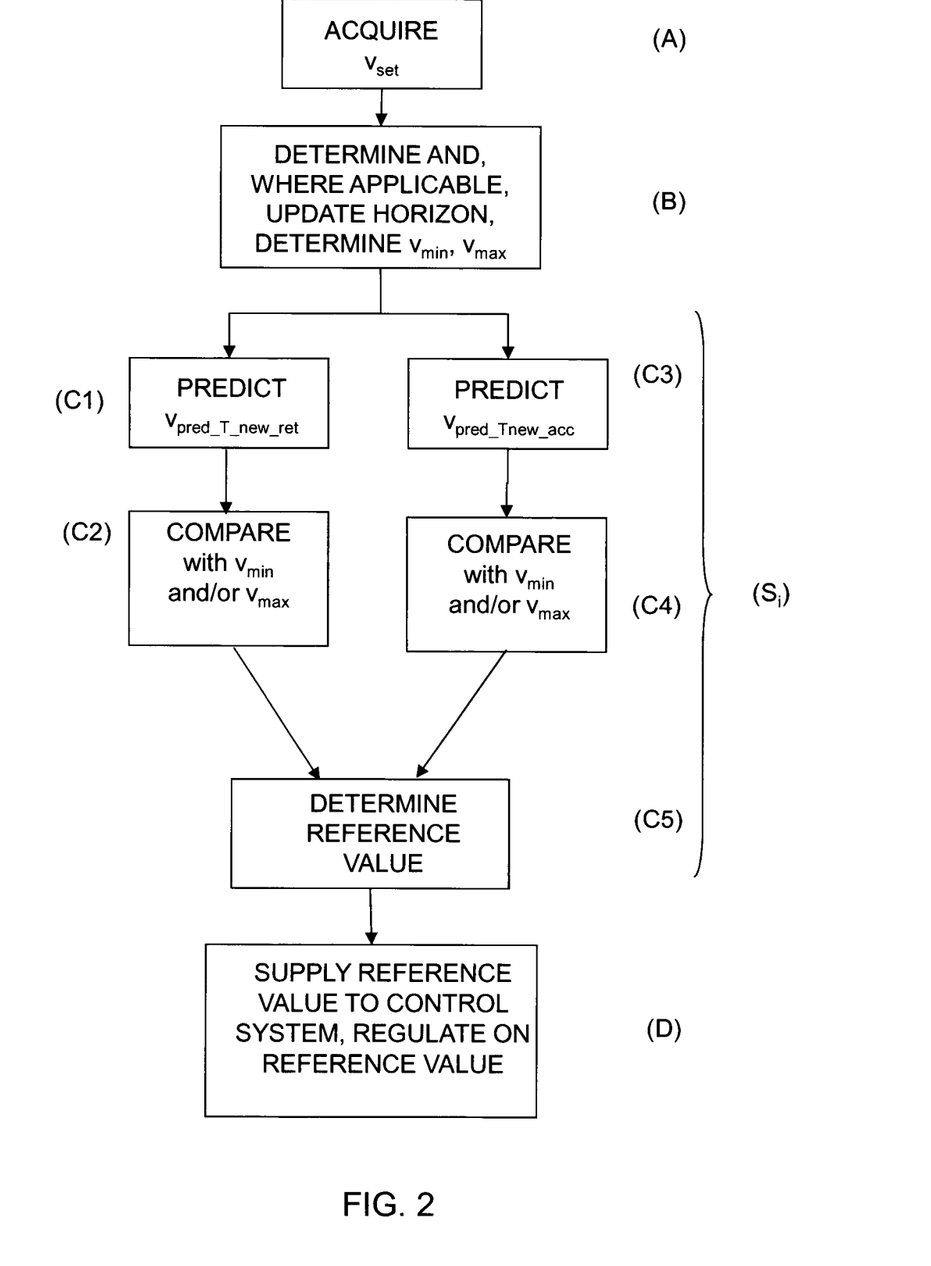
FIG. 2 is a flowchart for the steps which the module is arranged to perform according to an embodiment of the invention.

FIG. 2 is a flowchart for a method which inter alia comprises steps for the method according to the invention. The diagram comprises not only steps for the determination of reference values according to the invention but also steps for controlling the vehicle's speed according to an embodiment of the invention.

The method comprises a first step A) of acquiring $v_{set}$ as a desired set speed for the vehicle to maintain, and a second step B) of determining a horizon for the itinerary by means of map data and location data comprising route segments with at least one characteristic for each segment, and the lower and upper limit values $v_{min}$ and $v_{max}$, so that the set speed $v_{set}$ is within the range bounded by them. These limit values may here be determined on the basis of driver input and/or be determined automatically on the basis of parameters such as time gaps to vehicles ahead. This will be described in more detail below.

A number of simulation cycles may be done along the length of the horizon. A simulation cycle $s_j$ may comprise a number N of simulation steps which may be conducted at a predetermined rate f. According to the invention, the following steps are performed during such a simulation cycle $s_j$:

C1) Making a first prediction $b_{pred\_Tnew\_ret}$ of a vehicle speed along a horizon on the basis of an engine torque $T_{ret}$ which retards the vehicle as compared with a conventional cruise control.

C2) Comparing said first prediction $v_{pred\_Tnew\_ret}$ of the vehicle speed with a lower limit value $v_{min}$ and/or an upper limit value $v_{max}$ which delineate a range within which the vehicle's speed should be. Said first prediction thus does not have to be compared here both with the lower limit value $v_{min}$ and with the upper limit value $v_{max}$. According to the present invention, these limit values are such that the set speed $v_{set}$ is within the range bounded by them.

C3) Making a second prediction $v_{pred\_Tnew\_acc}$ of a vehicle speed along a horizon on the basis of an engine torque $T_{acc}$ which accelerates the vehicle as compared with a conventional cruise control.

C4) Comparing said second prediction $v_{pred\_Tnew\_acc}$ of the vehicle speed with a lower limit value $v_{min}$ and/or an upper limit value $v_{max}$ which delineate a range within which the vehicle's speed should be. Said second prediction thus does not have to be compared here both with the lower limit value $v_{min}$ and with the upper limit value $v_{max}$. According to the present invention, these limit values are such that the set speed $v_{set}$ is within the range bounded by them.

C5) determining at least one reference value on the basis of at least one of said respective comparisons and said first prediction $v_{pred\_Tnew\_ret}$ and second prediction $v_{pred\_Tnew\_acc}$ of the vehicle speed along the horizon. According to the present invention, the at least one reference value is thus here determined on the basis of the limit values being such that the set speed $v_{set}$ is within the range bounded by them.

As a further step D) said at least one reference value is then supplied, e.g. by being sent via a CAN bus, to a control system of the vehicle in which it is used to regulate the vehicle's speed according to said at least one reference value.

The method according to the present invention results in a constant and predetermined processor load when determining this at least one reference value, so the driver can easily set how these reference values are determined by single inputs in the system.

The set speed $v_{set}$ is thus the driver's input signal related to a desired cruise control speed, and the at least one reference value is the value on which the vehicle is regulated. The at least one reference value is preferably a reference speed $v_{ref}$, a reference torque $T_{ref}$ or a reference engine speed $\omega_{ref}$.

The reference speed $v_{ref}$, which thus constitutes the at least one reference value, is imparted to the speed regulator of the engine control unit. In traditional cruise control, as mentioned above, the reference speed $v_{ref}$ is equal to the set speed $v_{set}$, i.e. $v_{ref}=v_{set}$. The speed regulator then controls the vehicle's speed on the basis of the reference speed $v_{ref}$ by demanding necessary torque from the engine's torque regulator. According to the embodiment in which the at least one reference value is a reference torque $T_{ref}$, it may be sent directly to the engine's torque regulator. In the embodiment where the at least one reference value is a reference engine speed $\omega_{ref}$, it may be sent directly to the engine's speed regulator.

By using information about its itinerary, a vehicle's reference speed $v_{ref}$ to the speed regulator can be regulated to account for saving fuel, enhancing safety and improving comfort. As specialists will appreciate, other reference values to other control systems may also be regulated. The topography greatly affects the control in particular of the power train of heavy vehicles, since much more torque is required to travel uphill than downhill and to travel up steep hills without changing gear.

According to the present invention, reference values can be determined in a computationally efficient way. The module adapted to apply the method according to the invention may also be part of a control system whose reference values it is intended to regulate, but may also be a freestanding module separate from the control system.

The itinerary is herein exemplified as a single itinerary for the vehicle, but specialists will appreciate that various conceivable itineraries may be covered by information from maps and GPS or some other positioning system. The driver may also for example register the intended journey's starting and destination points, whereupon the unit will use map data etc. to work out an appropriate route.

According to an embodiment of the present invention, said respective first prediction $v_{pred\_Tnew\_ret}$ and second prediction $v_{pred\_Tnew\_acc}$ of the vehicle speed have to be within the range bounded by the lower and upper limit values $v_{min}$ and $v_{max}$. This means that the at least one reference value, which may be a reference speed $v_{ref}$, will have a value within this range, i.e. the reference speed $v_{ref}$ will be within a range bounded by these limit values, i.e. $v_{min} \leq v_{ref} \leq v_{max}$. The range comprises also the set speed $v_{set}$, since the range is itself relative to the set speed, i.e. $v_{min} \leq v_{set} \leq v_{max}$. The reference value to be used later by the vehicle's control system may thus be allowed to vary within this range when the regulating module predicts an internal horizon for the vehicle's speed.

According to another embodiment of the present invention, said respective first prediction $v_{pred\_Tnew\_ret}$ and second prediction $v_{pred\_Tnew\_acc}$ of the vehicle speed may be allowed to be at least partly outside the range bounded by the lower and upper limit values $v_{min}$ and $v_{max}$.

On for example a steep upgrade where the vehicle will lose speed, said second prediction $v_{pred\_Tnew\_acc}$ of the vehicle speed may reduce the retardation as much as possible in order to cause the maximum value of said second prediction to be below or equal to the upper limit value $v_{max}$ and in order to cause a minimum value of said second prediction to be below or equal to a further lower limit value $v_{min2}$. The vehicle's speed is thus here raised before the climb so that it loses less speed uphill.

In other words, the regulation tries to keep the vehicle speed within the range bounded by the lower and upper limit values $v_{min}$ and $v_{max}$, but the initial speed at the beginning of the climb can be adjusted according to the invention, resulting in a more constant vehicle speed than in the case of a conventional cruise control, e.g. on hilly roads where the vehicle may well be retarded and/or accelerated by its train weight.

It is advantageous to be able to allow a driver to alter speed ranges, since different drivers have different degrees of acceptance of how large the speed range should be. Such factors as type of road, e.g. number of traffic lanes, size of road, tight bends and steep hills may also affect driver acceptance of the speed range.

The driver's temperament may also affect his/her acceptance of the size of the speed range, e.g. stress may adversely affect willingness to reduce speed when approaching a downgrade, since this might be seen as losing journey time.

Large train weight for example may also cause the driver to want a large speed range in order to increase the system's potential for savings.

According to the present invention, the driver may use the input unit to manually set a set speed $v_{set}$ and the range, i.e. the lower and upper limit values $v_{min}$ and $v_{max}$, relative to the set speed $v_{set}$ within which the cruise control is actively allowed to function. The limits of the range are preferably set by one or more buttons in the steering wheel or on the instrument panel.

Various predefined range widths may also be selectable by the driver. If a single button is used for the input, various levels with different range widths may be stepped through by pressing the button repeatedly. The various range widths are preferably presented on a display. If instead the input unit comprises a number of buttons, one of them may be used to set the lower limit value $v_{min}$ and another to set the upper limit value $v_{max}$. These buttons are preferably situated on the input unit close to a button or the like which is used to input the set speed $v_{set}$. Specialists will appreciate that substantially any appropriate devices may be used for these inputs, e.g. buttons, levers, knobs, touch screens, menu choice devices etc.

The lower and upper limit values $v_{min}$ and $v_{max}$ may, according to an embodiment of the invention, be related to the set speed $v_{set}$.

According to a non-limitative example of using levels related to the set speed $v_{set}$, the driver adopts a set speed $v_{set}$ of 80 km/h, and a level as for example defined below in terms of respective lower and upper relativities in km/h to the set speed:

| Level | Lower rel. | Upper rel. | $v_{min}$ | $v_{max}$ |
|---|---|---|---|---|
| 1 | −5 km/h | +2 km/h | $v_{set}$ − 5 = 75 km/h | $v_{set}$ + 2 = 82 km/h |
| 2 | −7 km/h | +4 km/h | $v_{set}$ − 7 = 73 km/h | $v_{set}$ + 4 = 84 km/h |
| 3 | −10 km/h | +6 km/h | $v_{set}$ − 10 = 70 km/h | $v_{set}$ + 6 = 86 km/h |

If in this example the driver chooses level 1, it means that the reference speed $v_{ref}$ is allowed to vary between 75 and 82 km/h.

For the range bounded by the lower and upper limit values $v_{min}$ and $v_{max}$ there is therefore, according to an embodiment, a predetermined number of different levels which have different range widths related to the set speed $v_{set}$. Here the relativities between the set speed $v_{set}$ and the lower and upper limit values $v_{min}$ and $v_{max}$ are respective first and second predetermined numbers of km/h below and above the set speed $v_{set}$.

According to another embodiment, the relativities between the set speed $v_{set}$ and the lower and upper limit values $v_{min}$ and $v_{max}$ are respective first and second predetermined percentages below and above the set speed $v_{set}$. According to this embodiment, these limit values may differ by 2 to 20%, and preferably 4 to 15%, from the value of the set speed $v_{set}$.

According to a non-limitative example of using levels related to the set speed $v_{set}$, the driver adopts a set speed $v_{set}$ of 80 km/h, and a level as for example defined below in terms of lower and upper relativities in percent to the set speed $v_{set}$.

| Level | Lower rel. | Upper rel. | $v_{min}$ | $v_{max}$ |
|---|---|---|---|---|
| 1 | −15% | +0% | $v_{set}$ − 12 km/h | $v_{set}$ + 0 km/h |
| 2 | −10% | +2% | $v_{set}$ − 8 km/h | $v_{set}$ + 1.6 km/h |
| 3 | −5% | +5% | $v_{set}$ − 4 km/h | $v_{set}$ + 4 km/h |

If in this example the driver chooses level 1, it means that the reference speed $v_{ref}$ is allowed to vary between 68 and 80 km/h.

These embodiments in which there are various predefined levels for range widths make setting the cruise control's parameters very user-friendly. By one or two very simple inputs, the driver can here determine how the vehicle's speed is to be controlled.

According to an embodiment of the present invention, the lower and upper limit values $v_{min}$ and $v_{max}$ may be set independently of one another.

According to an embodiment of the invention, the range, i.e. the lower and upper limit values $v_{min}$ and $v_{max}$, is determined automatically. This setting is based on calculations of appropriate range widths. If for example the vehicle also has an adaptive cruise control (autonomous intelligent cruise control, AICC) which makes it possible to set a time gap relative to vehicles ahead, this time gap may also be accounted for in the above choice of level. In such cases a shorter time gap is related to a level with a small speed range (small range width) and a longer time gap to levels which allow larger speed variations (large range width).

The automatic setting of the range means that the driver can devote full attention to the road ahead instead of making inputs to the cruise control system, which does of course make driving the vehicle safer.

The ways described above of determining the range width make it possible for the range which bests suits the driver, the traffic situation and the terrain to be always achieved when determining the reference values. If both AICC and range choice by levels are available, the same button may preferably be used to select both. Moreover, the driver is able to influence the system, thereby increasing his/her acceptance of this function and willingness to use the system as an aid to driving the vehicle.

A so-called retarder cruise control (constant speed brake) of the vehicle is also acted upon by the controls according to the present invention, since the limit value $v_{kfb}$ for when the constant speed brake is activated is always higher than the range determined according to this invention, i.e. above the range bounded by the lower and upper limit values $v_{min}$ and $v_{max}$.

Figure 3:
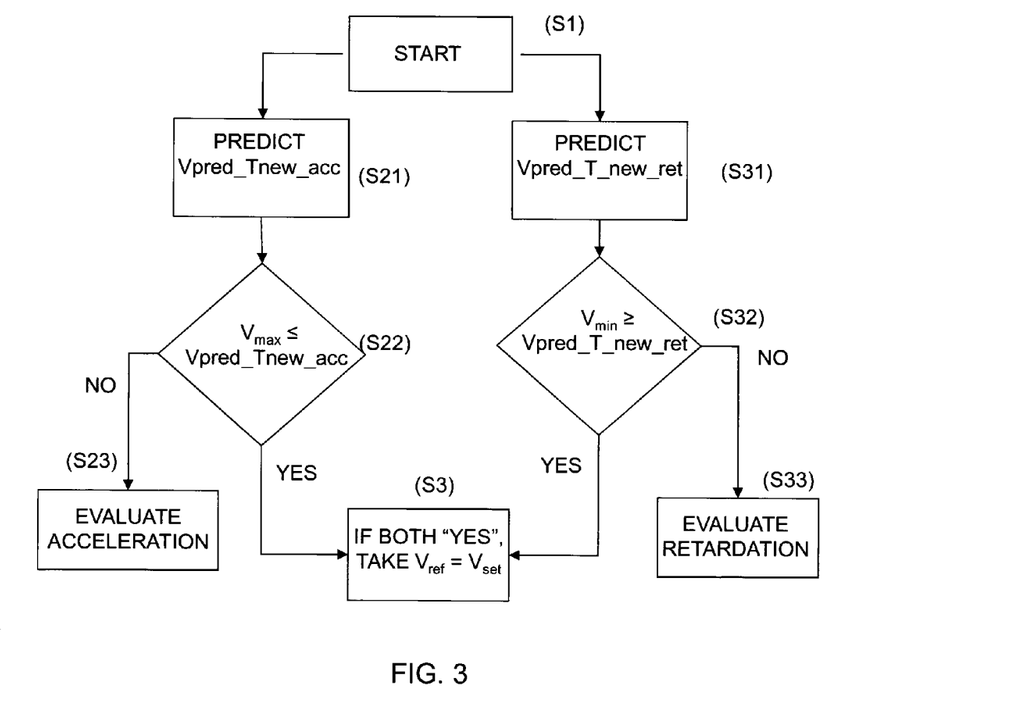
FIG. 3 is a flowchart for the steps which the module is arranged to perform according to an embodiment of the invention.

The flowchart in FIG. 3 illustrates how at the least one reference value is determined according to an embodiment of the invention. It shows the method starting at step S1. This is followed at steps S21 and S31 respectively by a first prediction $V_{pred\_Tnew\_ret}$ and a second prediction $V_{pred\_Tnew\_acc}$ of vehicle speed along the horizon, said first prediction based on an engine torque $T_{ret}$ which retards the vehicle as compared with a conventional cruise control, and said second prediction based on an engine torque $T_{acc}$ which accelerates the vehicle as compared with a conventional cruise control.

According to an embodiment of the invention, said first prediction $V_{pred\_Tnew\_ret}$ and second prediction $V_{pred\_Tnew\_acc}$ of a vehicle speed along the horizon are made in parallel, i.e. at substantially the same time in different branches of the flowchart for the method as illustrated in FIG. 3. According to another embodiment of the invention, said first prediction $V_{pred\_Tnew\_ret}$ and second prediction $V_{pred\_Tnew\_acc}$ of a vehicle speed along the horizon are made sequentially, i.e. one after another.

This is followed by the respective steps S22 and S32 of comparing said respective first prediction $v_{pred\_Tnew\_ret}$ and second prediction $v_{pred\_Tnew\_acc}$ of the vehicle speed with a lower value $v_{min}$ and/or an upper limit value $v_{max}$ which delineate a range within which the vehicle's speed should be. These comparisons take place at steps S22 and S32 in FIG. 3.

According to an embodiment, the respective comparisons of said first prediction $v_{pred\_Tnew\_ret}$ and second prediction $v_{pred\_Tnew\_acc}$ of the vehicle speed with a lower limit value $v_{min}$ and/or an upper limit value $v_{max}$ take place substantially in parallel at the respective steps S22 and S32, as depicted in FIG. 3. According to another embodiment, the comparisons of said first prediction $v_{pred\_Tnew\_ret}$ and second prediction $v_{pred\_Tnew\_acc}$ of the vehicle speed with a lower limit value $v_{min}$ and/or an upper limit value $v_{max}$ take place sequentially. According to the present invention the lower and upper limit values $v_{min}$ and $v_{max}$ are here such that the set speed $v_{set}$ is within the range bounded by them.

According to an embodiment of the invention, rules are applied for determining which at least one reference value the vehicle is to be regulated on. A set of rules is therefore used here to determine the value of the at least one reference value.

According to an embodiment, such a rule is that the at least one reference value, which here is the reference speed $v_{ref}$, is determined to be a value which represents the set speed $v_{set}$ if at the same time said first prediction $V_{pred\_Tnew\_ret}$ of the vehicle speed is below the lower limit value $v_{min}$ and said second prediction $V_{pred\_Tnew\_acc}$ of the vehicle speed is above the upper limit value $V_{max}$. This is illustrated at step S3 in FIG. 3, which the method moves on to if the result of both the S22 and the S32 comparisons is "YES".

If on the contrary said first prediction $v_{pred\_Tnew\_ret}$ of the vehicle speed is not below the lower limit value $v_{min}$, the method moves on to step S33, in which the retardation (the lowering of the speed) is evaluated.

At step S33, according to an embodiment, the reference speed $v_{ref}$ is determined to be a value which represents said first predicted vehicle speed $v_{pred\_Tnew\_ret}$ if a minimum value for said first predicted speed is equal to or above the lower limit value $v_{min}$ and if also a maximum value for said first predicted speed is equal to or above a further upper limit value $v_{max2}$ which is related to a set speed $v_{set}$. According to an embodiment, the further upper limit value $v_{max2}$ corresponds to the set speed plus a constant $c_1$, i.e. $v_{max2}=v_{set}\,c_1$. According to another embodiment, the further upper limit value $v_{max2}$ corresponds to a factor $c_1$ multiplied by the set speed $v_{set}$, i.e. $v_{max2}=V_{set}*c_1$. This factor $c_1$ may for example have the value 1.02, meaning that the further upper limit value $v_{max2}$ is 2% higher than the set speed $v_{set}$.

At step S33, according to an embodiment, the reference speed $v_{ref}$ is determined to be a value which corresponds to the set speed $v_{set}$ if said first predicted vehicle speed $v_{pred\_Tnew\_ret}$ is below the lower limit value $v_{min}$ and/or below the further upper limit value $v_{max2}$.

At step S33, according to an embodiment, the reference speed $v_{ref}$ is determined to be a value which corresponds to the lower limit value $v_{min}$ if a smallest value for said first predicted vehicle speed $v_{pred\_Tnew\_ret}$ is above or equal to the lower limit value and if a largest value for said first predicted speed is above or equal to the further upper limit value $v_{max2}$.

If on the contrary said second prediction $V_{pred\_Tnew\_acc}$ of the vehicle speed is below the upper limit value $v_{max}$, the method moves on to step S23, in which the acceleration (the raising of the speed) is evaluated.

At step S23, according to an embodiment, the reference speed $v_{ref}$ is determined to be a value which represents said second predicted vehicle speed $V_{pred\_Tnew\_acc}$ if a maximum value for said second predicted speed is equal to or below the upper limit value $v_{max}$ and if also a minimum value for said second predicted speed is equal to or below a further lower limit value $v_{min2}$ which is related to a set speed. According to an embodiment, the further lower limit value $v_{min2}$ corresponds to the set speed $v_{set}$ minus a constant $c_2$, i.e. $v_{min2}=v_{set}-c_2$. According to another embodiment, the further lower limit value $v_{min2}$ corresponds to a factor $c_2$ multiplied by the set speed, i.e. $v_{min2}=V_{set}*c_2$. This factor $c_2$ may for example have the value 0.98, meaning that the further upper limit value $v_{max2}$ is 2% lower than the set speed $v_{set}$.

At step S23, according to an embodiment, the reference speed $v_{ref}$ is determined to be a value which corresponds to the set speed $v_{set}$ if said second predicted vehicle speed $v_{pred\_Tnew\_acc}$ is above the upper limit value $v_{max}$ and/or above the further lower limit value $v_{min2}$.

At step S23, according to an embodiment, the reference speed $v_{ref}$ is determined to be a value which corresponds to the upper limit value $v_{max}$ if a largest value for the second predicted vehicle speed $v_{pred\_Tnew\_acc}$ is below or equal to the upper limit value $v_{max}$ and if a smallest value for second predicted speed is smaller than or equal to the further lower limit value $v_{min2}$. According to an embodiment of the invention, the reference speed $v_{ref}$ may here also be ramped up towards a value which corresponds to the further upper limit value $v_{max2}$.

How various rules may be applied to decide which at least one reference value on which the vehicle is to be regulated was described above. According to embodiments described below, cost functions are instead used for deciding which at least one reference value the vehicle is to be regulated on. FIG. 3 illustrates the calculations based on these cost functions at steps S23 and S33. How the cost functions are used in determining the at least one reference value will therefore be described in detail below in relation to further embodiments of the present invention.

According to an embodiment of the present invention, at least one further first prediction $v_{pred\_Tk+new\_ret}$ and second prediction $v_{pred\_Tk+new\_acc}$ of the vehicle's speed along the horizon are made in each simulation cycle $s_j$. Here a conventional predication of the vehicle's speed $v_{pred\_cc}$ along the horizon is first made according to a conventional cruise control. This is followed by at least one further first prediction $v_{pred\_Tk+new\_ret}$ of the vehicle's speed along the horizon, each of the at least one further first prediction based on a torque which is required to lower the vehicle's speed below the conventionally predicted vehicle speed $v_{pred\_cc}$. In addition, at least one further second prediction of the vehicle's speed along the horizon is made, each of the at least one further second prediction being based on a torque which is required to increase the vehicle's speed above the conventionally predicted vehicle speed $v_{pred\_cc}$, and the torque on which the at least one further first prediction $v_{pred\_Tk+new\_ret}$ and second prediction $v_{pred\_Tk+new\_acc}$ are based depends on said conventionally predicted vehicle speed $v_{pred\_cc}$ in the immediately preceding simulation cycle $s_{j-1}$.

According to this embodiment of the invention, a total of five different predictions of the vehicle's speed are here made, viz. $v_{pred\_cc}$, $v_{pred\_Tnew\_ret}$, $v_{pred\_Tnew\_acc}$, $v_{pred\_Tk+new\_ret}$ and $v_{pred\_Tk+new\_acc}$. Each of these predictions of the vehicle's speed other than the conventional prediction $v_{pred\_cc}$ is based on a torque which is required to increase the vehicle's speed above the first predicted vehicle speed $v_{pred\_cc}$ or on a torque which is required to lower the vehicle's speed below the first predicted vehicle speed $v_{pred\_cc}$, and the torque on which the at least one further first prediction $v_{pred\_Tk+new\_ret}$ and second prediction $v_{pred\_Tk+new\_acc}$ are based depends on said conventionally predicted vehicle speed $v_{pred\_cc}$, in the immediately preceding simulation cycle $s_{j-1}$.

According to an embodiment, other criteria are used for determining another torque T which results in an alternative mode of driving, in order to decide when and with what torque T the at least one further first prediction $v_{pred\_Tk+new\_ret}$ and second prediction $v_{pred\_Tk+new\_acc}$ of the vehicle's speed along the horizon are to be made, e.g. where particular comfort requirements are desired. Making the at least one further first prediction $v_{pred\_Tk+new\_ret}$ and second prediction $v_{pred\_Tk+new\_acc}$ preferably comprises initially one or more simulation steps by using functions of a conventional cruise control, followed by conducting the remaining simulation steps with a different torque T from that for the conventional cruise control, e.g. maximum or minimum torque in a similar way to as described above.

A total of five different predictions of the vehicle's speed, viz. $v_{pred\_cc}$, $v_{pred\_Tnew\_ret}$, $v_{pred\_Tnew\_acc}$, $v_{pred\_Tk+new\_ret}$ and $v_{pred\_Tk+new\_acc}$, with different control strategies are thus made according to this embodiment, for a limited distance of length L ahead of the vehicle, also called the horizon. Each such prediction preferably involves, according to an embodiment of the invention, calculating the vehicle's speed profile v, total energy consumption $E_N$ and journey time $t_N$.

The prediction of the conventional vehicle speed $v_{pred\_cc}$ gives the total energy consumption designated $E_{pred\_cc}$ and the total journey time designated $t_{pred\_cc}$ and decides which of the other control strategies/modes of driving are to be predicted, in a similar way to that described above.

According to an embodiment, the at least one reference value, which here is the reference speed $v_{ref}$, is determined to a value which represents the set speed $v_{set}$ if not only is said first prediction $V_{pred\_Tnew\_ret}$ of the vehicle speed below or equal to the lower limit value set directly or indirectly by the driver, e.g. the lower limit value $v_{min}$, but also said second prediction $v_{pred\_Tnew\_acc}$ of the vehicle speed is above or equal to the upper limit value $v_{max}$. This is illustrated at step S3, in FIG. 3, which the method moves on to if both of the comparisons at steps S22 and S32 produce the answer "YES".

The total time $t_{LA\_Tnew\_acc}$ and the total energy consumption $E_{LA\_Tnew\_acc}$ are calculated during each simulation cycle for the second predicted speed $v_{pred\_Tnew\_acc}$ based on an acceleration. The further second predicted vehicle speed $v_{pred\_Tk+new\_acc}$ is also predicted as described above, and the total time $t_{LA\_Tk+new\_acc}$ and the total energy consumption $E_{LA\_Tk+new\_acc}$ for the further second predicted vehicle speed $v_{pred\_Tk+new\_acc}$ are calculated during a single simulation cycle. The acceleration torque may here be any appropriate high engine torque which results in acceleration of the vehicle, e.g. a working point which has better efficiency and/or results in more comfortable acceleration than the maximum torque would.

The total time $t_{LA\_Tnew\_ret}$ and the total energy consumption $E_{LA\_Tnew\_ret}$ are calculated during each simulation cycle for the first predicted speed $v_{pred\_Tnew\_ret}$ and then represent the total time and the energy consumption for the first predicted speed $v_{pred\_Tnew\_ret}$ based on a retardation. In addition, the further first predicted vehicle speed $v_{pred\_Tk+new\_ret}$ is predicted as above, and the total time $t_{LA\_Tk+new\_ret}$ and the total energy consumption $E_{LA\_Tk+new\_ret}$ for the further first predicted vehicle speed $v_{pred\_Tk+new\_ret}$ are also predicted and then represent the total time and the energy consumption for the further first predicted vehicle speed $v_{pred\_Tk+new\_ret}$ based on a retardation, e.g. a minimum torque. The retardation torque may for example be a drag torque but might also be some other low engine torque which results in retardation if for example the working point has better efficiency and/or results in more comfortable retardation than the minimum torque would.

According to an embodiment of the invention, the speed predictions are evaluated by calculating the cost with respect to at least these predicted vehicle speeds. Determining said at least one reference value is therefore based here on at least one evaluation of a cost for at least one from among said first prediction $v_{pred\_Tnew\_ret}$, said second prediction $v_{pred\_Tnew\_acc}$ and a further first prediction $v_{pred\_Tk+new\_ret}$ and a further second prediction $v_{pred\_Tk+new\_acc}$ of the vehicle speed by using at least one cost function $J_{Tnew\_ret}$, $J_{Tnew\_acc}$, $J_{Tk+new\_ret}$, $J_{Tk+new\_acc}$. On the basis of these costs it is possible to identify one of the predictions of vehicle speeds/control strategies as the best one for the particular case, making it possible to choose an appropriate predicted vehicle speed/control strategy.

The calculation unit described above is preferably adapted to performing these calculations. According to an embodiment, the cost functions $J_{Tnew\_ret}$, $J_{Tnew\_acc}$, $J_{Tk+new\_ret}$ and $J_{Tk+new\_acc}$ for said first prediction $v_{pred\_Tnew\_ret}$, said second prediction $v_{pred\_Tnew\_acc}$, said further first prediction $v_{pred\_Tk+new\_ret}$ and said further second prediction $v_{pred\_Tk+new\_acc}$ of the vehicle speed are determined by weighting their respective energy reductions and journey time reductions relative to a conventional prediction of the vehicle's speed $v_{pred\_cc}$ with a weighting parameter $\beta$ according to the cost functions $$J_{Tnew\_ret} = \frac{E_{LA,Tnew\_ret}}{E_{pred\_cc}} + \beta \frac{t_{LA,Tnew\_ret}}{t_{pred\_cc}} \qquad \text{(eq. 15)}$$

$$J_{Tk+new\_ret} = \frac{E_{LA,Tk+new\_ret}}{E_{pred\_cc}} + \beta \frac{t_{LA,Tk+new\_ret}}{t_{pred\_cc}} \qquad \text{(eq. 16)}$$

$$J_{Tnew\_acc} = \frac{E_{LA,Tnew\_acc}}{E_{pred\_cc}} + \beta \frac{t_{LA,Tnew\_acc}}{t_{pred\_cc}} \qquad \text{(eq. 17)}$$

$$J_{Tk+new\_acc} = \frac{E_{LA,Tk+new\_acc}}{E_{pred\_cc}} + \beta \frac{t_{LA,Tk+new\_acc}}{t_{pred\_cc}} \qquad \text{(eq. 18)}$$

The cost functions $J_{Tnew\_ret}$, $J_{Tnew\_acc}$, $J_{Tk+new\_ret}$ and $J_{Tk+new\_acc}$ are thus standardised with respect to the vehicle's predicted mode of driving according to the conventional cruise control ($E_{pred\_cc}$ and $t_{pred\_cc}$). The cost estimations are therefore independent of, for example, the vehicle's weight. They are based solely on energy consumption and journey time, and the calculations take no account of the vehicle's fuel consumption. This means that there is no need for any model of the engine's efficiency, thereby simplifying the calculations when evaluating which control strategy is the most advantageous.

The weighting parameter $\beta$ also depends very little on vehicle weight, distance traveled and engine type. The introduction of modes or setting facilities for controlling the vehicle speed is thus simplified. According to an embodiment, the driver or the system may for example choose whether to give priority to reducing fuel consumption or reducing journey time by altering the weighting parameter $\beta$. This function may be presented to the driver in a user interface, e.g. in the vehicle's instrument panel, in the form of the weighting parameter $\beta$ or a parameter which depends on the weighting parameter $\beta$.

According to an embodiment of the invention, the cost functions $J_{Tnew\_ret}$, $J_{Tnew\_acc}$, $J_{Tk+new\_ret}$ and $J_{Tk+new\_acc}$ for said first prediction $v_{pred\_Tnew\_ret}$, said second prediction $v_{pred\_Tnew\_acc}$, said further first prediction $v_{pred\_Tk+new\_ret}$ and said further second prediction $v_{pred\_Tk+new\_acc}$ of the vehicle speed $v_{pred\_Tnew\_ret}$, are subjected to a cost function comparison, followed by determining said at least one reference value on the basis of said comparison to arrive at lowest cost. In other words, the reference value is set to whichever from among said first prediction, said second prediction, said further first prediction and said further second prediction of the vehicle speed results in least cost. This is done in this embodiment at step S23 for acceleration and at step S33 for retardation (FIG. 3).

According to an aspect of the invention a computer program product is proposed which comprises program instructions for enabling a computer system in a vehicle to perform steps according to the method described when those instructions are run on said computer system. The invention comprises also a computer program product in which the program instructions are stored on a medium which can be read by a computer system.

The present invention is not restricted to the embodiments described above. Various alternatives, modifications and equivalents may be used. The aforesaid embodiments therefore do not limit the invention's scope which is defined by the attached claims.

The invention claimed is:

1. A method for determination of at least one reference value of speed for a module, comprising an automated processor, the module controlling a speed of a vehicle, based on the at least one reference value of speed, wherein said at least one reference value of speed may differ from a value of speed corresponding to a set speed indicated by a driver of the vehicle, the method comprising:
   acquiring, by the module, the set speed indicated by the driver;
   making, by the module, a first prediction and a second prediction of a speed of the vehicle along a horizon, said first prediction being based on an engine torque which retards the speed of the vehicle when compared with the speed of the vehicle when the reference value of speed equals the set speed indicated by the driver, and said second prediction being based on an engine torque which increases the speed of the vehicle when compared with the speed of the vehicle when the reference value of speed equals the set speed indicated by the driver;
   comparing said first prediction and said second prediction, respectively, with a lower limit value and/or an upper limit value, wherein the lower limit value and the upper limit value delineate a speed range within which the speed of the vehicle is maintained;
   determining the at least one reference value of speed, based on at least one of said comparisons and said first prediction and second prediction of the speed of the vehicle along the horizon, so that the set speed indicated by the driver is within said speed range bounded by the lower and upper limit values; and
   outputting, from the module, the at least one reference value of speed to an engine system of the vehicle for control of the engine of the vehicle,
   wherein said comparison assesses whether said first prediction and said second prediction of the vehicle speed fulfil at least one of the following criteria:
   said second prediction is below or equal to said upper limit value; and
   said first prediction is above or equal to said lower limit value.

2. The method according to claim 1, wherein the lower and upper limit values for said speed range are set manually by the driver via an input unit.

3. The method according to claim 1, wherein a predetermined number of different speed range widths are defined for said speed range.

4. The method according to claim 3, wherein the lower and upper limit values for each speed range width are a first and a second predetermined number of km/h, respectively, below and above the set speed indicated by the driver.

5. The method according to claim 3, wherein the lower and upper limit values for each speed range width are a first and a second predetermined percentage, respectively, below and above the set speed indicated by the driver.

6. The method according to claim 3, wherein the lower and upper limit values are set automatically based on the speed range widths.

7. The method according to claim 6, wherein the speed range width is adjusted automatically based on a time gap to a vehicle ahead so that the speed range width is smaller for a short time gap and larger for a longer time gap.

8. A module configured to determine at least one reference value of speed, the module controlling a speed of a vehicle, based on the at least one reference value of speed, wherein said at least one reference value of speed may differ from a value of speed corresponding to a set speed indicated by a driver of the vehicle, the module comprising:
   a calculation unit comprising an automated processor and configured:
   to acquire the set speed indicated by the driver;
   to make a first prediction and a second prediction of the speed of the vehicle along a horizon, said first prediction being based on an engine torque which retards the speed of the vehicle when compared with the speed of the vehicle when the reference value of speed equals the set speed indicated by the driver, and said second prediction being based on an engine torque which increases the speed of the vehicle when compared with the speed of the vehicle when the reference value of speed equals the set speed indicated by the driver;
   to compare said first prediction and second prediction, respectively, with a lower limit value and/or an upper limit value, wherein the lower limit value and the upper limit value delineate a speed range within which the speed of the vehicle is maintained; and
   to determine the at least one reference value of speed, based on at least one of said comparisons and said first prediction and second prediction of the speed of the vehicle, so that the set speed indicated by the driver is within said speed range bounded by the lower and upper limit values; and
   the module being configured to output the at least one reference value of speed to an engine system of the vehicle for control of the engine of the vehicle,
   wherein the calculation unit is configured to determine whether in said comparison said first prediction and said second prediction fulfil at least one of the following criteria:
   said second prediction is below or equal to said upper limit value; and
   said first prediction is above or equal to said lower limit value.

9. The module according to claim 8, further comprising an input unit configured to receive an indication of the lower and upper limit values for said speed range.

10. The module according to claim 8, wherein a predetermined number of different speed range widths are defined for said speed range.

11. The module according to claim 10, wherein the lower and upper limit values for each speed range width are a first and a second predetermined number of km/h, respectively, below and above the set speed indicated by the driver.

12. The module according to claim 10, wherein the lower and upper limit values for each speed range width are a first and a second predetermined percentage, respectively, below and above the set speed indicated by the driver.

13. The module according to claim 10, wherein the lower and upper limit values are set automatically based on calculations of the speed range widths.

14. The module according to claim 13, wherein the speed range width is adjusted automatically based on a time gap to a vehicle ahead so that the speed range width is smaller for a short time gap and larger for a longer time gap.

15. A method for determination of at least one reference value of speed for a module, comprising an automated processor, the module controlling a speed of a vehicle, based on the at least one reference value of speed, wherein said at least one reference value of speed may differ from a value of speed corresponding to a set speed indicated by a driver of the vehicle, the method comprising:
- acquiring, by the module, the set speed indicated by the driver;
- making, by the module, a first prediction and a second prediction of a speed of the vehicle along a horizon, said first prediction being based on an engine torque which retards the speed of the vehicle when compared with the speed of the vehicle when the reference value of speed equals the set speed indicated by the driver, and said second prediction being based on an engine torque which increases the speed of the vehicle when compared with the speed of the vehicle when the reference value of speed equals the set speed indicated by the driver;
- comparing said first prediction and said second prediction, respectively, with a lower limit value and/or an upper limit value, wherein the lower limit value and the upper limit value delineate a speed range within which the speed of the vehicle is maintained;
- determining the at least one reference value of speed, based on at least one of said comparisons and said first prediction and second prediction of the speed of the vehicle along the horizon, so that the set speed indicated by the driver is within said speed range bounded by the lower and upper limit values;
- outputting, from the module, the at least one reference value of speed to an engine system of the vehicle for control of the engine of the vehicle, the method being performed by a computer system of the vehicle when instructions included on a non-transitory computer-readable medium are run on the computer system; and
- wherein said comparison assesses whether said first prediction and said second prediction of the vehicle speed fulfil at least one of the following criteria:
- said second prediction is below or equal to said upper limit value; and
- said first prediction is above or equal to said lower limit value.

16. A system including the module of claim 8 and a vehicle, the module being included in the vehicle.

\* \* \* \* \*